(12) United States Patent
Campomanes et al.

(10) Patent No.: US 9,731,349 B2
(45) Date of Patent: Aug. 15, 2017

(54) MOLD ASSEMBLY AND GUIDE ELEMENT THEREOF

(71) Applicant: Pratt & Whitney Canada Corp., Longueuil (CA)

(72) Inventors: Marc Campomanes, Longueuil (CA); Orlando Scalzo, Montreal (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 201 days.

(21) Appl. No.: 14/683,371

(22) Filed: Apr. 10, 2015

(65) Prior Publication Data
US 2016/0279698 A1  Sep. 29, 2016

Related U.S. Application Data

(60) Provisional application No. 62/138,574, filed on Mar. 26, 2015.

(51) Int. Cl.
*B22F 5/00* (2006.01)
*B22F 5/10* (2006.01)
*B22D 17/22* (2006.01)
*B29C 45/00* (2006.01)
*B22F 3/105* (2006.01)
*B22F 3/22* (2006.01)
(Continued)

(52) U.S. Cl.
CPC ............ *B22D 17/22* (2013.01); *B22F 3/1055* (2013.01); *B22F 3/225* (2013.01); *B22F 5/007* (2013.01); *B22F 5/009* (2013.01); *B29C 45/00* (2013.01); *B33Y 10/00* (2014.12); *B33Y 80/00* (2014.12); *Y02P 10/292* (2015.11); *Y02P 10/295* (2015.11)

(58) Field of Classification Search
CPC .... B22F 5/009; B22F 5/007; B22F 2005/103; B22F 5/10
USPC ......................................................... 249/176
See application file for complete search history.

(56) References Cited

U.S. PATENT DOCUMENTS 3,165,787 A * 1/1965 Carmack ................ B21D 28/30
                                                    164/347
4,861,534 A * 8/1989 Boehm ............... B29C 45/2628
                                                    249/102
(Continued)

FOREIGN PATENT DOCUMENTS

DE            1209276 B  *  1/1966    ......... B29C 45/2628

*Primary Examiner* — Robert B Davis
(74) *Attorney, Agent, or Firm* — Norton Rose Fulbright Canada (57) ABSTRACT

A mold assembly includes a first mold part having guide passages defined therein. Protruding members are each movably received in a first portion of a respective guide passage to extend selectively in and out of the mold cavity. At least some of the protruding members are movable along different directions from one another. Cables are each connected to one of the protruding members and extend through a linear second portion of the respective guide passage and out of the first mold part. An actuator is connected to the cables and movable relative to the first mold part between an extended position and a retracted position. In the extended position, each protruding member protrudes into the mold cavity. In the retracted position, each of protruding member is retracted out of the mold cavity and contained within the respective guide passage. A guide element and a method of molding are also discussed.

22 Claims, 8 Drawing Sheets

(51) Int. Cl.
    *B33Y 10/00*     (2015.01)
    *B33Y 80/00*     (2015.01)

(56) References Cited

U.S. PATENT DOCUMENTS

| | | | |
|---|---|---|---|
| 5,779,833 A * | 7/1998 | Cawley | A61F 2/30942 |
| | | | 156/263 |
| 5,798,073 A * | 8/1998 | Johnson | B29C 33/0033 |
| | | | 249/154 |
| 6,844,518 B1 | 1/2005 | Coons et al. | |
| 7,802,981 B2 * | 9/2010 | Liu | B29C 33/44 |
| | | | 249/176 |
| 8,784,041 B2 * | 7/2014 | Durocher | F01D 9/04 |
| | | | 164/111 |
| 2004/0207108 A1 * | 10/2004 | Pacchiana | B29C 43/006 |
| | | | 264/109 |
| 2008/0237909 A1 * | 10/2008 | Bech | B22F 5/007 |
| | | | 264/101 |

* cited by examiner

MOLD ASSEMBLY AND GUIDE ELEMENT THEREOF

CROSS-REFERENCE TO RELATED APPLICATIONS

This application claims priority from provisional application No. 62/138,574 filed Mar. 26, 2015, the entire contents of which are incorporated by reference herein.

TECHNICAL FIELD

The application relates generally to molding and, more particularly, to the molding of components having multiple features created by movable pins or other members protruding into the mold cavity.

BACKGROUND OF THE ART

Metal injection molding (MIM) is a near-net injection process that allows very small details to be moulded into a component, including for example small holes and feather-seal slots. The creation of multiple small details may present a challenge in mold design, particularly when the mold needs to be automated. For example, for a component including multiple holes extending at different composite angles from one another and produced using mold pins, actuation of the mold pins in and out of the mold cavity typically requires a separate actuator for each pin, or a complex mechanism of cams or levers to actuate all the pins simultaneously. Accordingly, automation becomes more difficult as the number of holes to be created increases.

SUMMARY

In one aspect, there is provided a mold assembly defining a mold cavity, the assembly comprising: at least first and second mold parts each having a mold surface bordering a respective part of the mold cavity, the first and second mold parts being movable relative to one another to selectively open and close the mold cavity; the first mold part having guide passages defined therein each extending between a respective first opening defined in the mold surface of the first mold part and a respective second opening defined in an outer surface of the first mold part, each of the guide passages having a first portion extending from the respective first opening and a second portion extending from the respective second opening, the second portion being linear; a plurality of protruding members each movably received in the first portion of a respective one of the guide passages to extend selectively in and out of the mold cavity, at least some of the protruding members being movable within the respective one of the guide passages along different directions from one another; a plurality of cables each connected to a respective one of the protruding members and extending through the second portion of the respective one of the guide passages and out of the second opening thereof; and an actuator connected to the plurality of cables, the actuator movable relative to the first mold part between an extended position and a retracted position, wherein with the actuator in the extended position, each of the plurality of protruding members protrudes into the mold cavity, and with the actuator in the retracted position, each of the plurality of protruding members is retracted out of the mold cavity and contained within the respective one of the guide passages.

In another aspect, there is provided a guide element for receiving cables for actuation of members in different directions, the guide element comprising: a body having first and second surfaces, and a plurality of guide passages defined through the body each sized to receive one of the cables, each of the guide passages providing communication between a respective first opening defined in the first surface and a respective second opening defined in the second surface, wherein: each of the guide passages has a first portion extending from the respective first opening and a second portion extending from the respective second opening, the second portion being linear; for at least one of the guide passages, the first and second portions extend along non-parallel directions with respect to one another; and the second portion of each of the guide passages extends at a respective angle of at most 5 degrees with respect to a common reference direction.

In a particular embodiment, the body the guide element is directly manufactured with the guide passages defined therethrough by additive manufacturing.

In a further aspect, there is provided a method of molding a component, the method comprising: injecting material in a mold cavity to form the component, the mold cavity including a plurality of movable members extending therethrough to each define an opening in the component; removing the plurality of movable members from the mold cavity by sliding each of the plurality of movable members along a respective central axis thereof; wherein sliding each of the plurality of movable members includes moving a plurality of cables each connected to a respective one of the plurality of movable members with an actuator connected to the plurality of cables to slide each of the plurality of cables through a respective guide passage defined in a guide while changing a direction of at least one of the plurality of cables with a shape of the respective one of the guide passages.

DESCRIPTION OF THE DRAWINGS

Reference is now made to the accompanying figures in which.

DETAILED DESCRIPTION

Figure 1:
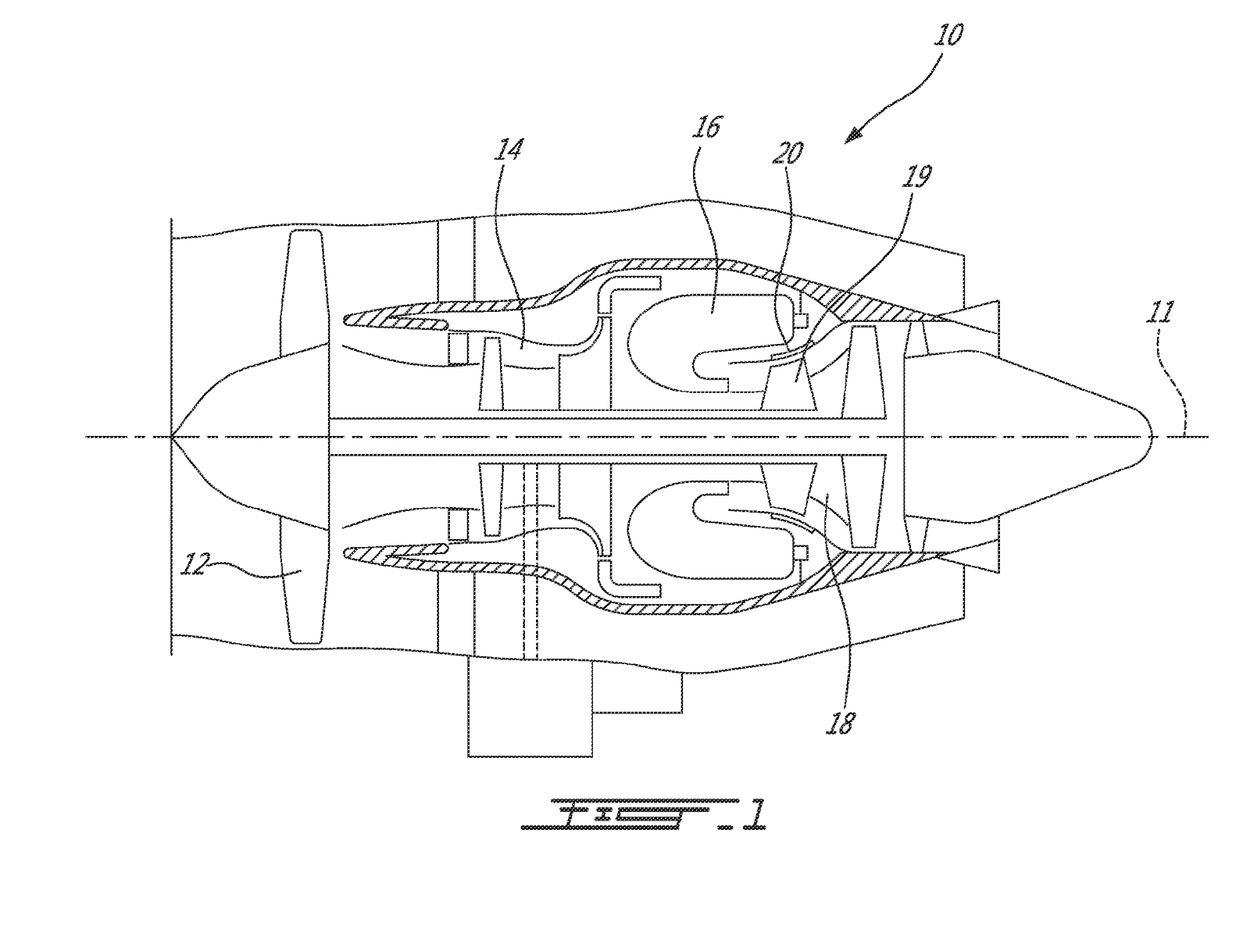
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Although the gas turbine engine 10 is shown here as a turbofan, it is understood that the gas turbine engine 10 may have any other appropriate type of configuration, and may be for example a turboprop or turboshaft engine.

The turbine section 18 generally comprises one or more stages of rotor blades 19 extending radially outwardly from respective rotor disks, with the blade tips being disposed closely adjacent to a stationary annular turbine shroud 20 supported from the engine casing. In a particular embodiment, the turbine shroud 20 is segmented in the circumferential direction and accordingly includes a plurality of similar or identical circumferentially adjoining shroud segments 22 (FIG. 2) together defining the annular turbine shroud 20. The turbine shroud 20 defines a portion of the radially outer boundary of the engine gas path. In a particular embodiment, each shroud segment 22 is individually supported and located within the engine by an outer housing support structure (not shown).

Figure 2:
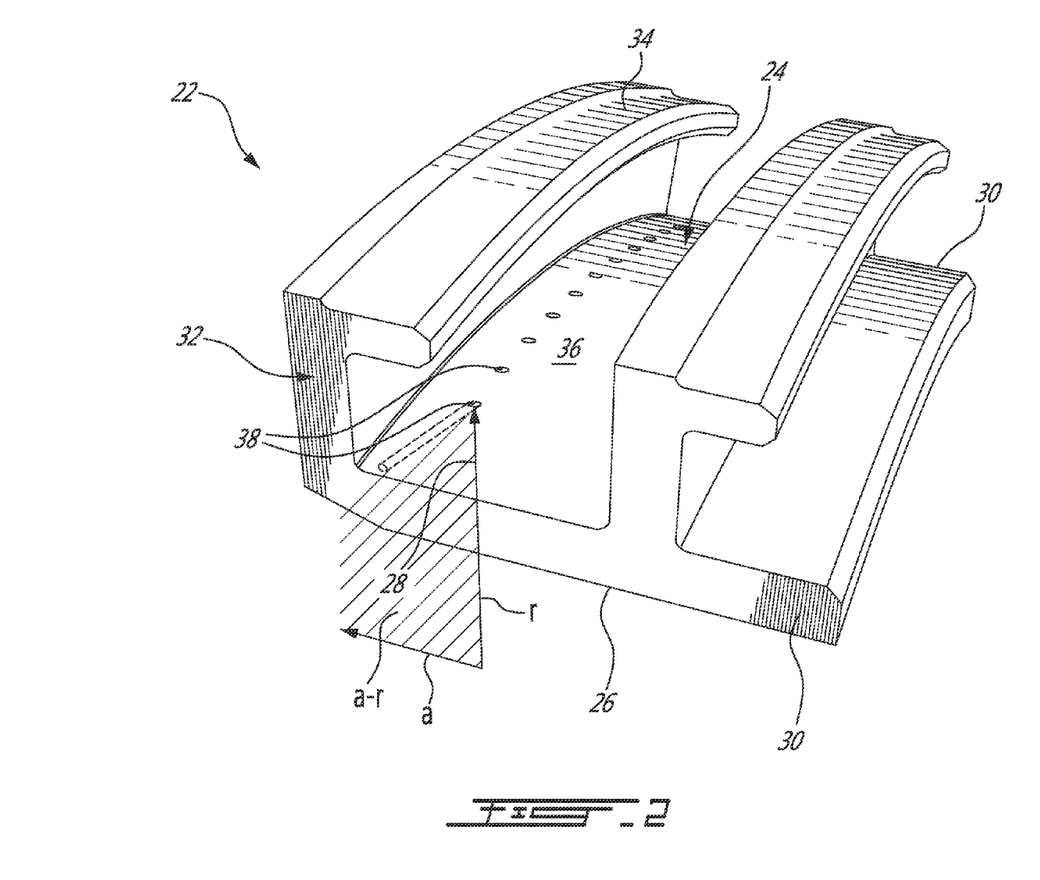
FIG. 2 is a schematic tridimensional view of a shroud segment of the gas turbine engine of FIG. 1, in accordance with a particular embodiment.

Referring to FIG. 2, in a particular embodiment, each shroud segment 22 includes an arcuate platform 24 having an inner gas path surface 26 which is adapted to be exposed to the hot combustion gases during engine operation and an opposed outer cold surface 28. The platform 24 extends between circumferentially opposed ends 30 which mate with the circumferential end of the abutting shroud segments to form the shroud. Axially spaced-apart front and rear legs 32 extend radially outwardly from the outer surface 28 of the platform 24. The legs 32 are each provided with a respective axially projecting hook or rail portion 34 for engagement with corresponding mounting flange projections (not shown) of the surrounding support structure in the engine 10. When assembled in the engine 10, a shroud plenum 36 is defined between the legs 32 and between the outer surface 28 of the platform 24 and the support structure, for receiving cooling air from a cooling air source, for example bleed air from the compressor section 14. It is understood that the retention elements formed by the legs and hook portions 32, 34 are shown as an example only and can be replaced by any other appropriate type of retention elements.

Figure 8:
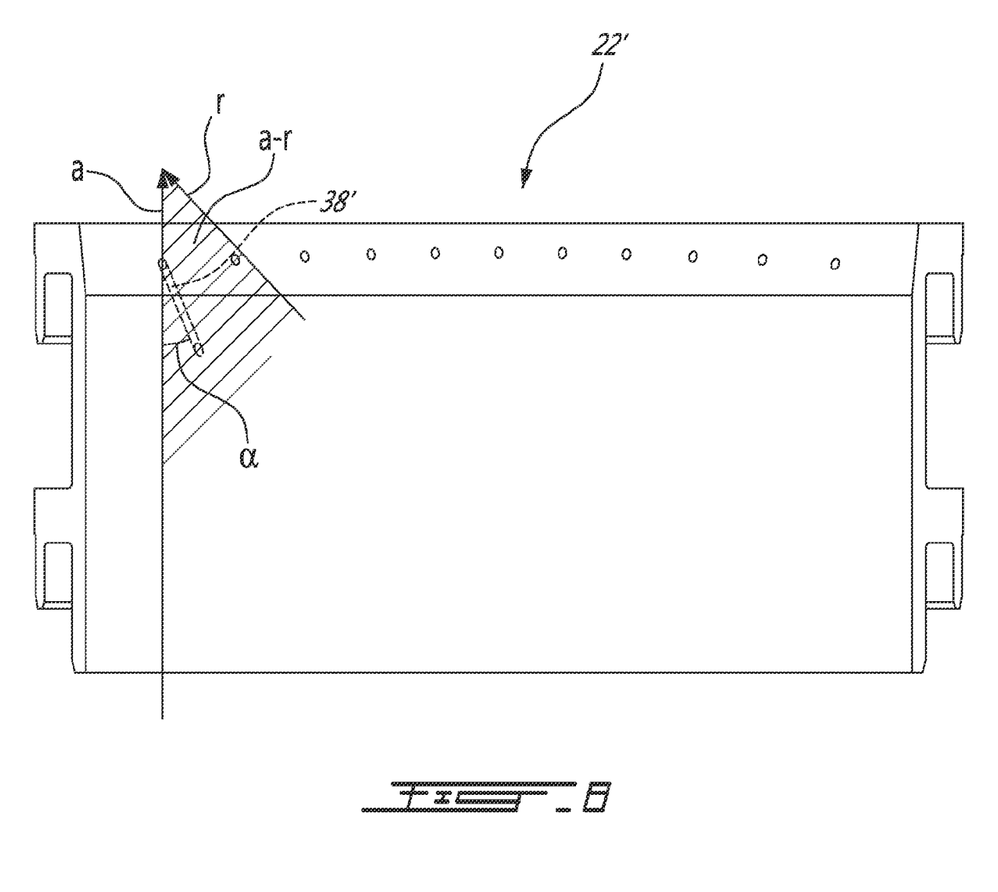
FIG. 8 is a schematic bottom view of a shroud segment of the gas turbine engine of FIG. 1, in accordance with another particular embodiment.

The platform 24 includes a plurality of cooling holes 38 defined therethrough. The cooling holes 38 are circumferentially spaced apart. In a particular embodiment, each cooling hole 38 extends in a respective radial plane a-r, defined by the radial and axial directions r, a of the shroud segment 22 at the hole (one hole being visible in FIG. 3). In the embodiment shown, each hole 38 is angled (i.e. extends at a non-zero angle) with respect to the corresponding radial direction r and with respect to the axial direction a of the shroud segment 22 within the respective radial plane a-r. Other configurations are also possible. For example, some or all of the holes may extend at a non-zero angle a with respect to the respective radial plane a-r, as illustrated in FIG. 8 with the holes 38' of the shroud segment 22'. Alternately or in addition, some or all of the holes may extend along the radial direction r and/or some or all of the holes may extend along the axial direction a (not shown).

Although not shown, other recesses or slots may be defined in the shroud segment 22, for example slots for receiving sealing members therein, including, but not limited to, radially extending slots in the legs, in the side of the legs facing the plenum, and/or in the circumferential ends of the platform. Other features may also be provided in the shroud segment 22, including, but not limited to, other cooling holes and fluid passages, angular timing features, and pockets.

In a particular embodiment, the shroud segment 22 is manufactured from a green part, obtained for example by powder injection molding using one more appropriate feedstock(s) each including powder material held by a binder. The molded green part is then removed from the mold, and submitted to debinding and sintering to obtain the finished shroud segment 22. Other molding methods are also possible.

Figure 3:
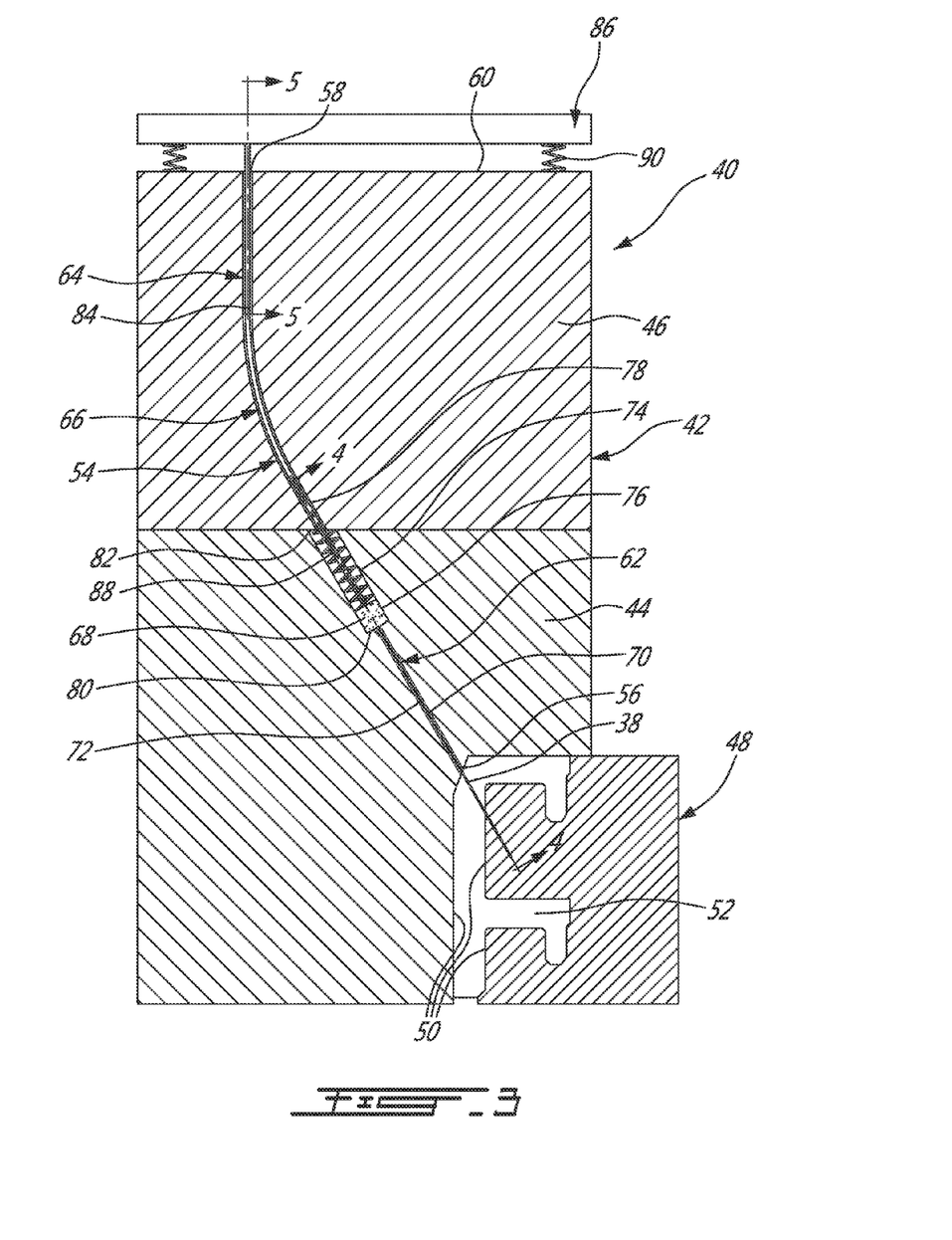
FIG. 3 is a schematic cross-sectional view of a mold assembly according to a particular embodiment, which may be used to mold a shroud segment such as shown in FIG. 2.
Figure 4:
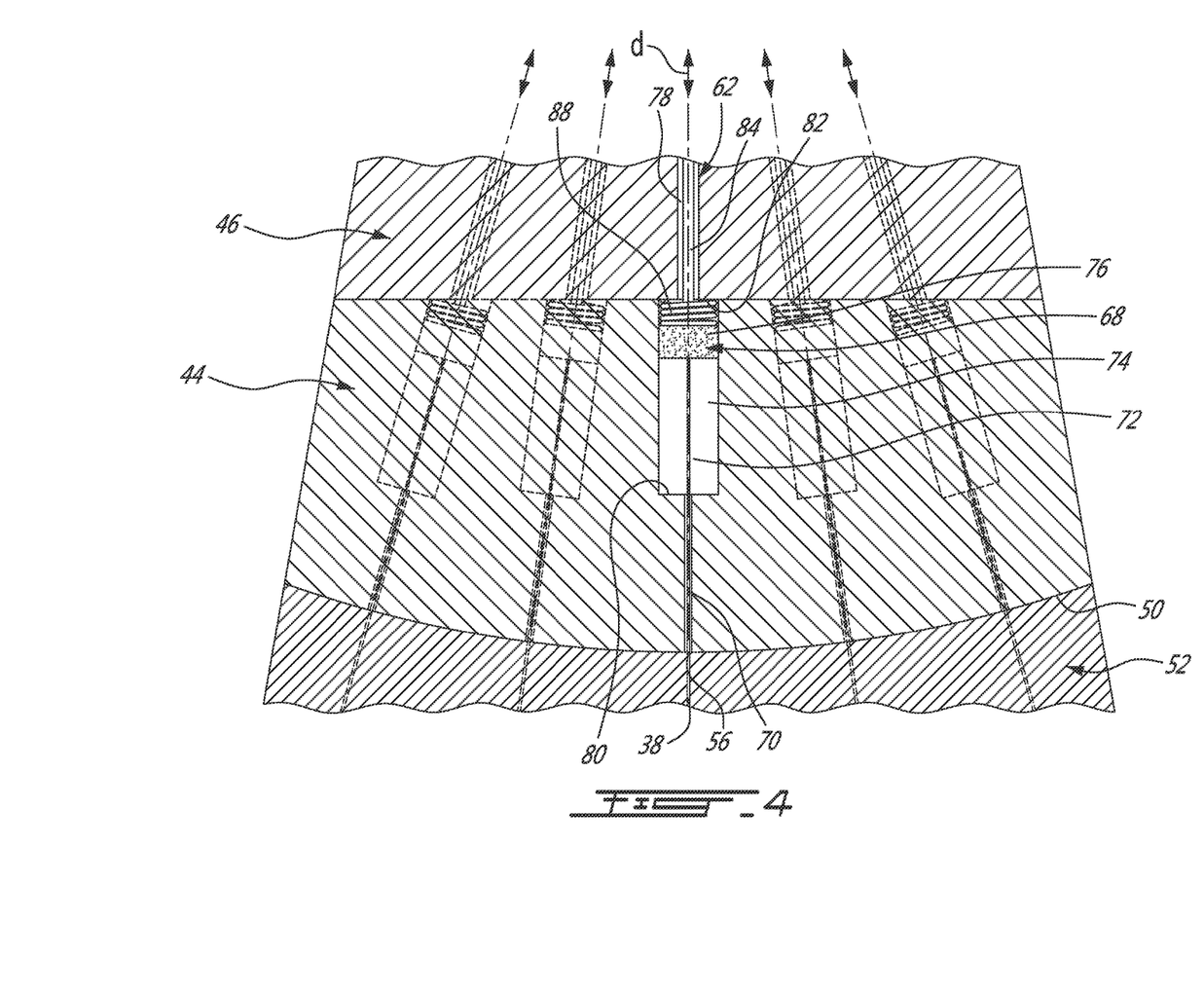
FIG. 4 is a schematic partial cross-sectional view of the mold assembly of FIG. 3, taken along line 4-4.
Figure 5:
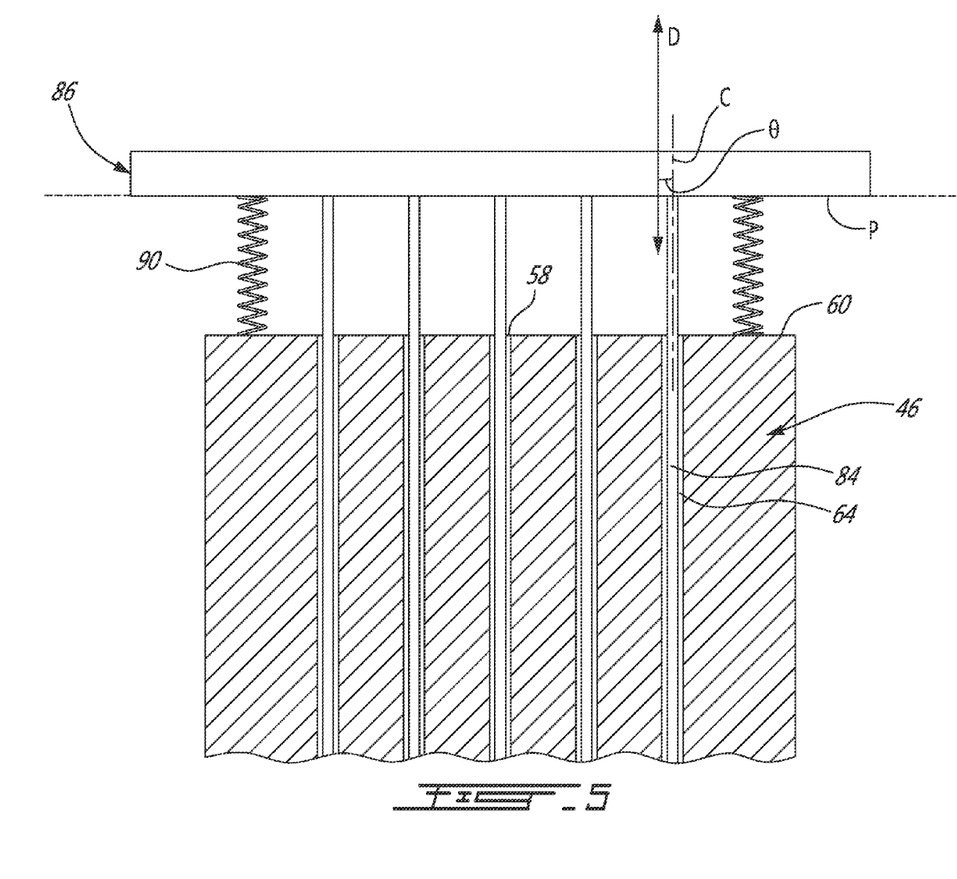
FIG. 5 is a schematic partial cross-sectional view of the mold assembly of FIG. 3, taken along line 5-5.

Referring to FIGS. 3-5, a mold assembly 40 in accordance with a particular embodiment is generally shown, which may be used for example to mold the green part corresponding to the shroud segment 22. The mold assembly 40 includes a mold with a first mold part 42 which in the embodiment shown includes a mold element 44 and a guide element 46 connected to one another, and a second mold part 48 (FIG. 3). The mold element 44 and second mold parts 48 each have a respective mold surface 50, and the two mold surfaces 50 are complementary to together define and border the mold cavity 52. The mold parts 42, 48 are relatively movable with respect to one another such as to be able to access the mold cavity 52 to remove the molded part therefrom. Although the mold element 44 and guide element 46 are depicted as separate elements, it is understood that alternately the first mold part 42 can be made in one piece. Moreover, it should be understood that the mold cavity 52 may be defined by more than two mold parts with complementary mold surfaces.

The first mold part 42 has guide passages 54 defined therein, one for each of the cooling holes 38 to be formed in the shroud segment 22. Each of the guide passages 54 extends through the mold element 44 and the guide element 46, from a first opening 56 defined in the mold surface 50 to a second opening 58 defined in an outer surface 60 of the guide element 46. Each guide passage 54 has a first portion 62 extending from the opening 56 in the mold surface 50, a second portion 64 extending from the opening 58 in the outer surface 60 of the guide element 46, and a transition portion 66 providing the communication between the first and second portions 62, 64. Although the guide passage 54 is shown as being contained within a single plane in FIG. 3, it is understood that in another embodiment, the guide passage 54 may have a different configuration; for example, a portion of the guide passage 54 defined in the guide element 46 may extend at a non-zero angle with respect to the plane of FIG. 3. Other configurations are also possible.

Figure 7:
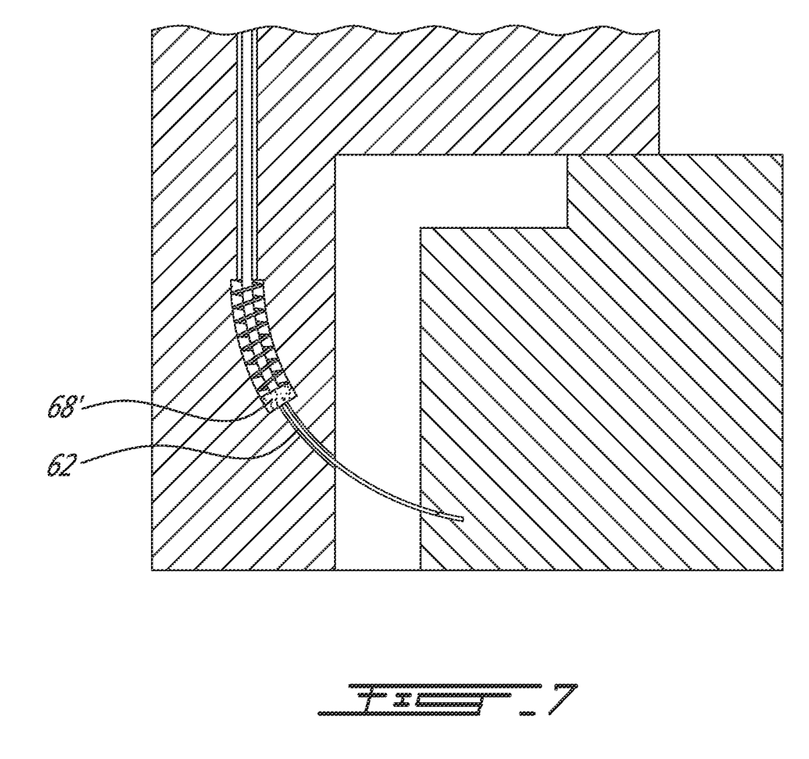
FIG. 7 is a schematic partial cross-sectional view of a mold assembly according to another particular embodiment.

The mold assembly 40 includes a movable protruding member 68 movably received in the first portion 62 of each guide passage 54. In the embodiment shown, each movable protruding member 68 is a straight mold pin, and the first portion 62 is shaped in correspondence with the shape of the pin, and accordingly linear. Other shapes are possible, including, as illustrated for example in FIG. 7, the protruding member 68' being an arcuate pin and the first portion 62 having a corresponding arcuate shape, to allow the formation of arcuate openings in the molded component. In a particular embodiment, the protruding member 68 or pin is rigid.

Referring back to FIGS. 3-4, in the embodiment shown the first portion 62 of each guide passage 54 has a body portion 70 extending from the first opening 56, sized to receive the elongated body 72 of the pin 68; a head portion 74 extending from the body portion 70 and having a diameter sufficient to receive the enlarged head 76 of the pin 68; and a connection portion 78 extending from the head portion 74 opposite the body portion 70 to connect with the transition portion 66. The body portion 70 and connection portion 78 of the guide passage 54 both have a diameter smaller than that of the pin head 76 such that the pin head 76 is trapped within the head portion 74 of the guide passage 54. The pin 68 is sized such that with the pin head 76 abutting the shoulder 80 at the junction between the body portion 70 and the head portion 74, the pin body 72 protrudes in the mold cavity 52 in the appropriate position to create the desired opening in the component to be molded. In the particular embodiment shown, the pin body 72 extends completely across the mold cavity 52 and into receiving holes defined in the second mold part 48 (FIG. 3).

In the embodiment shown, the shoulder 82 at the junction between the head portion 74 and the connection portion 78 is defined at the interface between the mold element 44 and the guide element 46, such that the body portion 70 and head portion 74 of the guide passage 54 are defined in the mold element 44, and the connection portion 78 of the guide passage 54 is defined in the guide element 46. Other configurations are also possible.

In the embodiment shown and with reference to FIG. 4, since the cooling holes 38 are not parallel to one another, the mold pins 68 are movable along different (non-parallel) directions d with respect to one another, which may extend at compound angles with respect to one another. Accordingly the first portions 62 of all of the guide passages 54 are non-parallel to one another. In the embodiment shown, the first portions 62 extend at compound angles with respect to one another, being angled with respect to one another both in the plane of FIG. 4 (where only one first portion 62 extends) and along a direction transverse to that of the plane of FIG. 4. Alternately, some of the first portions 62 may be parallel to one another.

Referring to FIGS. 3-5, the mold assembly 40 includes a cable connected to each pin head 76. Each cable 84 is movably received in the second portion 64, the transition portion 66 and the connection portion 78 of a respective one of the guide passages 54. As can be seen in FIGS. 3 and 5, the second portion 64 of each guide passage 54 is linear, and is oriented to direct the cable 84 such that multiple cables 84 can be simultaneously moved by a common actuator 86. In the embodiment shown, the first and second portions 62, 64 of the guide passage 54 extend along non-parallel directions with respect to one another, and the transition portion 66 provides for a smooth transition between these two directions. Accordingly the transition portion 66 is preferably arcuate, although any shape allowing the cable 84 to freely slide therein can be used.

It is understood that one or more of the guide passages 54 may be completely linear with concentric first and second portions 62, 64 if the corresponding pin 68 is oriented in a direction sufficiently close to that of the movement of the actuator 86. However, at least some of the guide passages 54 are shaped to change the orientation of the cable 84 received therein, and accordingly have a non-linear shape, which may be difficult or impossible to obtain through machining of the body of the first mold part 42. In the embodiment shown, the change of direction defined by the transition portion 66 is contained in the guide element 46. Accordingly, in a particular embodiment, the guide element 46 is manufactured using additive manufacturing, which allows for the curved guide passages 54 to be defined as the body of the guide element 46 is manufactured. Suitable additive manufacturing methods include, but are not limited to, powder bed fusion laser, electron beam melting (EBM), selective laser melting, and direct metal laser sintering (DMLS).

In a particular embodiment, the first portions 62 of the guide passages 54 are straight and the mold element 44 only includes part of the first portion 62 of each of the guide passages 54, and the mold and guide elements 44, 46 are manufactured separately. Accordingly, different manufacturing processes can be used to manufacture the two elements 44, 46, for example a machining process for the mold element 44, allowing for precision forming of the mold surface 50 within relatively tight tolerances, and a less precise additive manufacturing process for the guide element 46, allowing for easy forming of the curved portions of the guide passages 54. The separate mold and guide elements 44, 46 also allow for ease of insertion of the pins 68 and cables 84 within the guide passages 54.

In an embodiment where the first mold part 42 is manufactured in one piece, i.e. with integral mold and guide elements 44, 46 forming a monolithic part, the first mold part 42 together with the pins 68 may be manufactured using additive manufacturing, or the pins 68 may be inserted into the mold part 42 during fabrication using any appropriate technique.

The actuator 86 may be any type of member which can be used to move the cables 84. In the embodiment shown, the actuator 86 is a plate, and is connected to the multiple cables 84 coming from the multiple guide passages 54. In the particular embodiment shown, all the cables 84 of the mold assembly 40 are connected to the same actuator 86. The actuator 86 is movable with respect to the mold parts 42, 48 between an extended and a retracted position, and movement of the actuator 86 moves the pins 68 through movement of the cables 84 attached thereto and to the actuator 86. The actuator 86 may be moved by any appropriate method, including, but not limited to, one or more pneumatic or hydraulic piston(s), a motor, and a magnetic assembly.

In the retracted position depicted in FIG. 4, the pins 68 are contained in the first mold part 42 and accordingly out of the mold cavity 52. In this position, the molded component can be disengaged from the mold cavity 52 without interference from the pins 68. In the extended position depicted in FIG. 3, the pins 68 protrude in the mold cavity 52 in the appropriate position to create the desired opening in the component to be molded, here with the pin body 72 extending completely across the mold cavity 52 and into the second mold part 48.

Referring to FIG. 5, the second portions 64 of the guide passages 54 are relatively oriented such that the cables 84 connected to the actuator 86 can be actuated together in a predetermined direction through movement of the actuator 86 regardless of the relative orientations of the first portions 62 of the guide passages 54 and of the pins 68 with respect to one another. Accordingly, the second portions 64 of the guide passages 54 must have an orientation close enough to one another such that simultaneous actuation of the cables 84 received therein through movement of the actuator 86 is possible, the orientations being sufficiently close to keep any lateral force exerted on the cables 84 through movement of the actuator 86 below an acceptable threshold. In a particular embodiment, the portions of the cables 84 extending out of the second portions 64 move together between the extended and retracted positions along a linear direction D under the action of the actuator 86, and a central axis C of each of the second portions 64, as well as of the cables 84 extending out of the second portions 64, are oriented at an angle $\theta$ with respect to the linear direction D with each angle $\theta$ having a value of at most 5 degrees. The angle $\theta$ of each second portion 64 is measured in a plane of reference containing both the central axis C and the linear direction D, and accordingly the plane of reference may differ between the second portions 64. In a particular embodiment, the central axis C of each of the second portions 64 and/or of the cables 84 extending out of the second portions 64 are parallel to one another and to the linear direction D, i.e. the angle θ for each of the second portions 64 and/or each of the cables 84 is 0. Other angles are also possible, including angles having a value greater than 5 degrees. However, in a particular embodiment, the angle θ for each second portion 64 is minimized, such as to prevent or minimize bending, buckling, and/or rubbing of the cables 84 against the edges of the openings 58.

In the particular embodiment shown, the actuator 86 moves the portions of the cables 84 extending out of the second portions 64 together along the linear direction D through linear movement of the actuator 86 along the linear direction D. Other configurations are also possible, including, but not limited to, the actuator moving through a pivoting movement, providing a different displacement length for different ones of the cables 84.

Referring to FIGS. 3-4, in the embodiment shown each pin 68 is biased toward the extended position, for example by a spring 88 contained in the head portion 74 of the guide passage 54 and abutting the pin head 76 and the shoulder 82 between the head portion 74 and connection portion 78 of the guide passage 54. Accordingly, the pins 68 are moved to the extended position by action of the springs 88. In a particular embodiment, each spring 88 is capped with a set-screw (not shown) having a hole allowing the cable 84 to pass through. The set-screw connects the pin 68 and cable 84 may be used to adjust the pre-load on the spring 88.

Alternately, where the stiffness of the cables 84 is sufficient to transmit a pushing force without buckling of the cables 84, the springs 88 may be omitted and the pins 68 are moved from the retracted to the extended position through a pushing force applied by the actuator 86 to the cables 84.

Referring to FIGS. 3 and 5, in the embodiment shown, the actuator 86 is biased toward the retracted position, for example by one or more springs 90 extending between the actuator 86 and the outer surface 60 of the guide element 46. The biasing force on the actuator 86 is larger than the biasing force pushing the pins 68 toward the extended position, such that the default position of the mold assembly 40 is the retracted position. When the pins 68 need to be extended, a force greater than the biasing force of the spring(s) 90 of the actuator 86 is exerted against the actuator 86 to move it to the extended position, allowing the individual springs 88 of the pins 68 to push the pins in the extended position or transmitting a pushing force through the cables 84 if the springs 88 are omitted. Alternately, the bias of the actuator 86 may be omitted.

Figure 6:
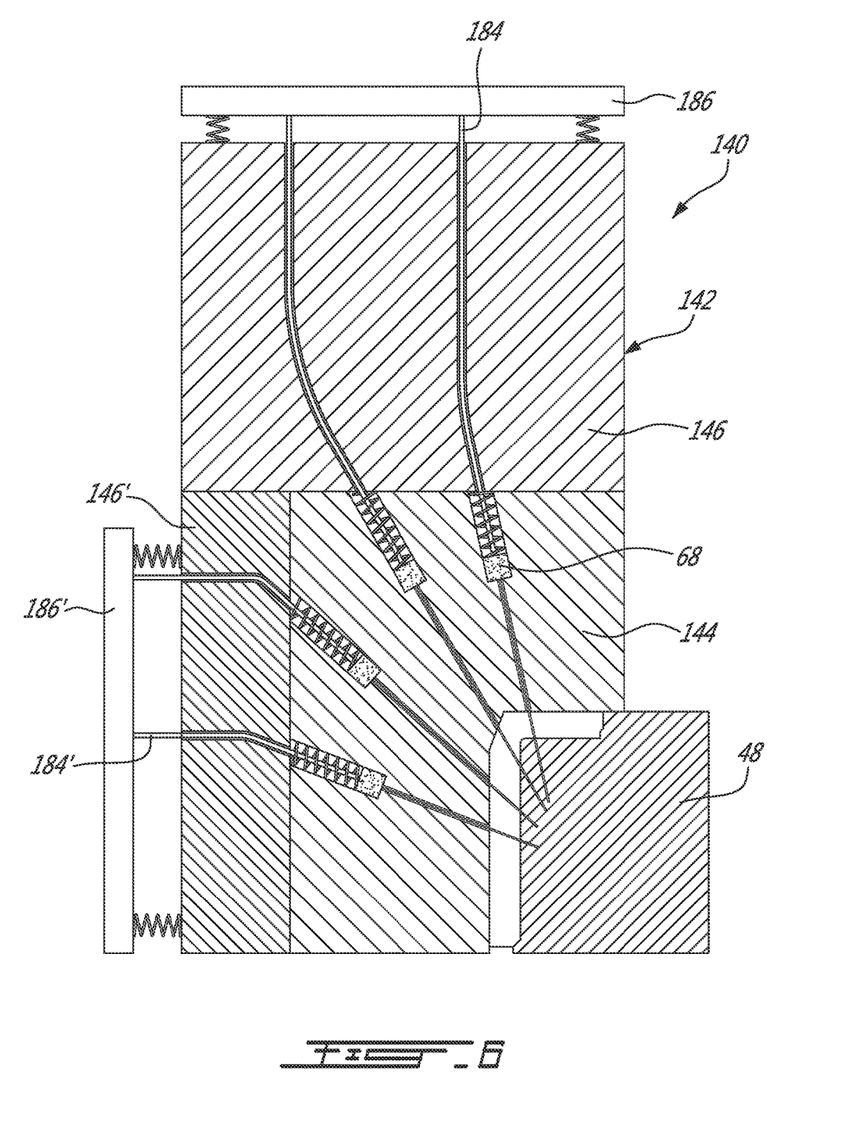
FIG. 6 is a schematic cross-sectional view of a mold assembly according to another particular embodiment, which may be used to mold a shroud segment such as shown in FIG. 2.

Referring to FIG. 6, a mold assembly 140 according to another embodiment is shown, showing multiple pins 68 having different orientations from one another located in a same plane. The first mold part 142 may be provided in one piece, or in multiple pieces, for example with a mold element 144 and two guide element 146, 146' with connecting surfaces thereof being indicated by the dotted lines. The cables 184, 184' are connected in groups, with each group having its respective actuator 186, 186'. Although two groups are shown, it is understood that more than two groups may be provided.

In use, the molding material (e.g. powder injection molding feedstock) is injected into the mold cavity 52 in which the protruding members 68 (e.g. mold pins) are extending. Once the component is molded, the protruding members 68 are removed from the mold cavity 52 by sliding each protruding member 68 along its central axis (e.g. linearly for a straight pin, arcuately for an arcuate pin). The protruding members 68 are slid by moving the actuator 86, 186, 186' connected to the cables 84, 184, 184' of the protruding members 68 to slide each cable 84, 184, 184' in the respective guide passage 54, and the shape of the guide passages 54 changes the direction of at least one of the cables 84, 184, 184'.

It is understood that although the protruding members 68 have been described and shown here as a plurality of mold pins, alternate types of protruding members which are designed to penetrate the mold cavity before injection of the molding material and to be removed therefrom before the molded component is disengaged from the cavity may be similarly actuated through the cables extending through the guide, including, but not limited to, inserts and tabs shaped to create slots. The term "protruding members" is intended to include any member that comes in contact with the molded part during molding and that needs to retract for the molded part to be removed from the mold, including, but not limited to, members defining outer surfaces and outer surface features of the molded part. Different types of protruding members may be used in combination.

It can be seen that the guide element 46, 146, 146' allows for transposition of the movement of the actuator 86, 186, 186' into multiple directions (axes of motion) through the cables 84, 184, 184' which are guided by the guide passages 54. This may allow for automation of the molding process with actuation of multiple members 68 having different orientations from one another without the need for complex mechanisms of cams and/or levers or multiple individual actuators to transfer the motion along the different axes of motion of the members.

Although the mold assembly 40, 140, guide element 46, 146, 146' and method have been shown and described in the context of molding of the shroud segment 22, it is understood that the mold assembly 40, 140, guide element 46, 146, 146' and method can be used to mold other components of the guide turbine engine 10 (including, but not limited to, vane segments, vane rings, heat shields and other combustor components, fuel nozzle portions, shroud plates), or any other type of component which is manufactured by a molding process, including, but not limited to, power or metal injection molding.

The above description is meant to be exemplary only, and one skilled in the art will recognize that changes may be made to the embodiments described without departing from the scope of the invention disclosed. For example, the guide element may be used to guide the actuation of multiple members moving simultaneously in different directions in settings other than a molding assembly. Other modifications which fall within the scope of the present invention will be apparent to those skilled in the art, in light of a review of this disclosure, and such modifications are intended to fall within the appended claims.

The invention claimed is:

1. A mold assembly defining a mold cavity, the assembly comprising:
    at least first and second mold parts each having a mold surface bordering a respective part of the mold cavity, the first and second mold parts being movable relative to one another to selectively open and close the mold cavity;
    the first mold part having guide passages defined therein each extending between a respective first opening defined in the mold surface of the first mold part and a respective second opening defined in an outer surface of the first mold part, each of the guide passages having a first portion extending from the respective first opening and a second portion extending from the respective second opening, the second portion being linear;

a plurality of protruding members each movably received in the first portion of a respective one of the guide passages to extend selectively in and out of the mold cavity, at least some of the protruding members being movable within the respective one of the guide passages along different directions from one another;

a plurality of cables each connected to a respective one of the protruding members and extending through the second portion of the respective one of the guide passages and out of the second opening thereof; and an actuator connected to the plurality of cables, the actuator movable relative to the first mold part between an extended position and a retracted position, wherein with the actuator in the extended position, each of the plurality of protruding members protrudes into the mold cavity, and with the actuator in the retracted position, each of the plurality of protruding members is retracted out of the mold cavity and contained within the respective one of the guide passages.

2. The assembly as defined in claim 1, further comprising:
a second plurality of protruding members each movably received in the first portion of a respective one of the guide passages to extend selectively in and out of the mold cavity;
a second plurality of cables each connected to a respective one of the protruding members and extending through the second portion of the respective one of the guide passages and out of the second opening thereof; and
a second actuator connected to the second plurality of cables, the second actuator movable relative to the first mold part between an extended position and a retracted position, wherein with the second actuator in the extended position, each of the second plurality of protruding members protrudes into the mold cavity, and with the second actuator in the retracted position, each of the second plurality of protruding members is retracted out of the mold cavity and contained within the respective one of the guide passages.

3. The assembly as defined in claim 1, wherein the plurality of protruding members includes at least one mold pin.

4. The assembly as defined in claim 1, wherein the first and portions of each of the guide passages extend along different directions from one another.

5. The assembly as defined in claim 1, wherein the actuator is movable between the extended and the retracted positions along a linear direction, and the second portion of each of the guide passages receiving one of the plurality of cables extends at an angle of at most 5 degrees with respect to the linear direction.

6. The assembly as defined in claim 1, wherein the plurality of protruding members are biased to protrude into the mold cavity.

7. The assembly as defined in claim 6, wherein the actuator is biased toward the retracted position by a biasing force overcoming the bias of the plurality of protruding members.

8. The assembly as defined in claim 1, wherein the first mold part includes a mold element and a guide element detachable from one another, the mold element including the mold surface of the first mold part and the guide element including the outer surface, a transition portion connecting the first and second portions of each of the guide passages being defined in the guide element.

9. The assembly as defined in claim 1, wherein each of the plurality of protruding members is a pin having a head and an elongated body extending from the head, the head having a greater diameter than the elongated body, the first portion of the respective one of the guide passages including a body portion extending from the first opening and receiving the elongated body of the pin, a head portion extending from the body portion and receiving the head of the pin, and a connection portion extending from the head portion opposite the body portion, the body portion and the connection portion having a smaller diameter than that of the head of the pin such that a movement of the pin within the first portion is limited by a movement of the head of the pin confined within the head portion.

10. A guide element for receiving cables for actuation of members in different directions, the guide element comprising:
a body having first and second surfaces, and a plurality of guide passages defined through the body each sized to receive one of the cables, each of the guide passages providing communication between a respective first opening defined in the first surface and a respective second opening defined in the second surface, wherein:
each of the guide passages has a first portion extending from the respective first opening and a second portion extending from the respective second opening, the second portion being linear;
for at least one of the guide passages, the first and second portions extend along non-parallel directions with respect to one another; and
the second portion of each of the guide passages extends at a respective angle of at most 5 degrees with respect to a common reference direction;
wherein the first surface is a mold surface, and wherein:
the first portion has a body portion extending from the first opening, a head portion extending from the body portion, and a connection portion extending from the head portion opposite the body portion; and
the head portion has a greater diameter than that of the body portion and of the connection portion such that a first shoulder is defined at a junction between the head and connection portions and a second shoulder is defined at a junction between the head and body portions.

11. The guide element as defined in claim 10, wherein the first portion of each of the guide passages is linear, and the first portions of at least two of the guide passages extend along non-parallel directions with respect to one another.

12. The guide element as defined in claim 10, wherein for each of the guide passages, the first and second portions extend along non-parallel directions with respect to one another.

13. In combination, a mold element having a mold surface and a contact surface, and the guide element as defined in claim 10, the mold element having a plurality of additional guide passages defined therethrough extending from the contact surface to the mold surface, the additional guide passages being disposed such that with the mold element engaged to the guide with the contact surface of the mold element abutting the first surface of the guide, each of the additional guide passages communicates and is in alignment with a respective one of the guide passages.

14. A method of forming the guide element as defined in claim 10, comprising directly manufacturing the body with the guide passages defined therethrough by additive manufacturing.

15. A method of molding a component, the method comprising:
injecting material in a mold cavity to form the component, the mold cavity including a plurality of movable members extending therethrough to each define an opening in the component;
removing the plurality of movable members from the mold cavity by sliding each of the plurality of movable members along a respective central axis thereof;
wherein sliding each of the plurality of movable members includes moving a plurality of cables each connected to a respective one of the plurality of movable members with an actuator connected to the plurality of cables to slide each of the plurality of cables through a respective guide passage defined in a guide while changing a direction of at least one of the plurality of cables with a shape of the respective one of the guide passages.

16. The method as defined in claim 15, wherein each of the plurality of cables extends out of the respective one of the guide passages to the common actuator at an angle of at most 5 degrees with respect to a common reference direction.

17. The method as defined in claim 15, wherein before injecting the material in the mold cavity, each of the plurality of movable members is slid into the cavity through action of a respective spring.

18. The method as defined in claim 17, wherein the actuator is moved to remove the plurality of movable members from the mold cavity through action of one or more springs creating a biasing force overcoming a force of the respective spring of each of the plurality of movable members.

19. The method as defined in claim 15, wherein the plurality of movable members includes a plurality of straight mold pins.

20. A guide element for receiving cables for actuation of members in different directions, the guide element comprising:
a body having first and second surfaces, and a plurality of guide passages defined through the body each sized to receive one of the cables, each of the guide passages providing communication between a respective first opening defined in the first surface and a respective second opening defined in the second surface, wherein:
each of the guide passages has a first portion extending from the respective first opening and a second portion extending from the respective second opening, the second portion being linear, the first and second portions extending along non-parallel directions with respect to one another; and
the second portion of each of the guide passages extends at a respective angle of at most 5 degrees with respect to a common reference direction.

21. The guide element as defined in claim 20, wherein the first portion of each of the guide passages is linear, and the first portions of at least two of the guide passages extend along non-parallel directions with respect to one another.

22. In combination, a mold element having a mold surface and a contact surface, and the guide element as defined in claim 20, the mold element having a plurality of additional guide passages defined therethrough extending from the contact surface to the mold surface, the additional guide passages being disposed such that with the mold element engaged to the guide with the contact surface of the mold element abutting the first surface of the guide, each of the additional guide passages communicates and is in alignment with a respective one of the guide passages.

* * * * *